United States Patent
Drahos et al.

(10) Patent No.: US 6,836,972 B2
(45) Date of Patent: Jan. 4, 2005

(54) ELECTRONIC LEVEL WITH AUDIBLE AND VISUAL INDICATORS

(76) Inventors: Lloyd Drahos, deceased, late of Rochester, MN (US); by Lisa Drahos, legal representative, 4933 S. Carson St. No. 105, Aurora, CO (US) 88015

( * ) Notice: Subject to any disclaimer, the term of this patent is extended or adjusted under 35 U.S.C. 154(b) by 0 days.

(21) Appl. No.: 10/404,501

(22) Filed: Apr. 1, 2003

(65) Prior Publication Data

US 2004/0194329 A1 Oct. 7, 2004

(51) Int. Cl.[7] .................................................. G01C 9/06
(52) U.S. Cl. .................................. 33/366.11; 33/366.24
(58) Field of Search ........................ 33/366.11, 366.12, 33/366.16, 366.15, 366.23, 366.24

(56) References Cited

U.S. PATENT DOCUMENTS

| | | | | |
|---|---|---|---|---|
| 3,172,212 A | * | 3/1965 | Pappas ..................... | 33/366.12 |
| 4,079,521 A | * | 3/1978 | Uhorczak ................ | 33/366.12 |
| 4,152,839 A | * | 5/1979 | McDonald ............... | 33/366.12 |
| 4,182,046 A | | 1/1980 | Ludlow et al. | |
| 4,437,241 A | * | 3/1984 | Lemelson .................... | 33/818 |
| 4,506,450 A | * | 3/1985 | Fleming et al. .......... | 33/366.12 |
| 4,574,491 A | | 3/1986 | Vining | |
| 4,592,147 A | * | 6/1986 | Herman .................... | 33/366.16 |
| 4,625,423 A | * | 12/1986 | Sackett ..................... | 33/366.16 |
| 4,654,977 A | * | 4/1987 | Pakus ....................... | 33/366.12 |
| 4,716,534 A | | 12/1987 | Baucom et al. | |
| RE32,962 E | | 6/1989 | Tudek | |
| 5,020,232 A | | 6/1991 | Whiteford | |
| 5,134,780 A | * | 8/1992 | Butler et al. .............. | 33/366.11 |
| 5,159,761 A | * | 11/1992 | Cagan et al. ............. | 33/366.14 |
| 5,313,713 A | | 5/1994 | Heger et al. | |
| 5,561,911 A | | 10/1996 | Martin | |
| 5,592,745 A | * | 1/1997 | Heger et al. .............. | 33/366.12 |
| 6,037,874 A | | 3/2000 | Heironimus | |
| 6,058,617 A | | 5/2000 | Nadu | |
| 6,473,979 B2 | * | 11/2002 | Lu ............................... | 33/356 |
| 6,516,527 B1 | * | 2/2003 | Moriyasu .................. | 33/366.15 |
| 6,658,755 B2 | * | 12/2003 | Arlinsky ...................... | 33/760 |

* cited by examiner

Primary Examiner—Christopher W. Fulton
(74) Attorney, Agent, or Firm—Dale J. Ream

(57) ABSTRACT

An instrument for determining angular inclinations includes a rectangular frame having a generally transparent rotatable disk positioned therein. The disk includes a weight that is gravitationally attracted to the Earth's surface and circuitry for determining the disk's relative rotational position. A light source and sensor surround the disk and cooperate to determine the disk's angular position according to opaque lines imprinted on the disk's surface. The instrument includes a speech generator having a memory in which a plurality of audible messages corresponding to respective angular inclinations are stored. The instrument includes logic circuitry for determining an appropriate message to be generated according to the sensed position of the disk. This message is emitted through a speaker. The instrument further includes visual indicators relative to the angular inclination of the frame. Audible messages in multiple languages are stored in the speech generator memory and may be selectively accessed by a user.

6 Claims, 7 Drawing Sheets

US 6,836,972 B2

ELECTRONIC LEVEL WITH AUDIBLE AND VISUAL INDICATORS

BACKGROUND OF THE INVENTION

This invention relates generally to angular measurement devices and, more particularly, to an electronic slope indicating instrument which provides both visual and audible indications of angular measurement.

Bubble levels have traditionally been used to indicate alignment with a horizontal or vertical axis. Such a level typically includes one or more bubble vials in which the position of a gas bubble relative to a pair of transverse lines indicates a respective alignment. However, a traditional bubble level can be extremely time-consuming and inconvenient to use. Often the workpiece whose angular alignment is in question must be adjusted at some distance from the point of measurement, requiring the worker to travel repeatedly from the point of adjustment to the place where the level is located. The direct reading of the level is also difficult because it may be used in poorly lighted areas where the bubble cannot readily be seen.

Various types of electronic levels have been proposed in the art for providing a level which gives an audio indication that angular alignment has been achieved. Although assumably effective for their intended purposes, the existing devices suffer from disadvantages such as a lack of portability, relative crudeness in determining actual angular displacement, or a general fragility of construction which is unsuitable in the actual environment of the workplace.

Therefore, it is desirable to have an angular inclination measurement device that provides angle indications both visually and audibly. Further, it is desirable to have a measurement device that provides audible angle messages in a selectable language. In addition, it is desirable to have a measurement device that can transmit audible angle indications to a remote location.

SUMMARY OF THE INVENTION

An electronic level with visual and audible indicators for measuring and indicating angular inclinations according to the present invention includes a frame having a generally rectangular configuration. The instrument includes a generally transparent disk mounted for rotation within the frame. The disk includes first and second sides, the disk being rotated by a weight attached thereto that is attracted to the Earth's surface by gravity. A plurality of opaque radial lines are imprinted upon the disk surface. A light-emitting source and a light sensor are mounted adjacent first and second sides of the disk, respectively, such that the disk is interposed therebetween. The light-emitting source directs light toward the light sensor along a path substantially perpendicular to the disk and the light sensor is capable of generating sensed signals responsive to the opaque lines. The particular sensed signals generated by the light sensor effectively identify the precise rotational position of the disk and thus the angular inclination of the instrument.

The instrument includes a sound generator having a first memory for storing a plurality of audible messages corresponding to respective angular inclinations. Circuitry operatively connected to the disk includes a second memory for storing sensed signals from the light sensor. Logic circuitry such as a programmable logic circuit ("PLC") is electrically connected to the first and second memories and to the speech generator for determining and selecting the appropriate audible message according to a sensed signal. The sound generator is electrically connected to a speaker for emitting the selected message. The selected message may also be transmitted to a remotely positioned speaker using a transmitter/receiver combination. This enables a worker to hear the audible indication from a distance without increasing the volume of the speaker mounted to the frame.

Therefore, a general object of this invention is to provide an electronic angular measurement level which provides both visual and audible angle measurement indicators.

Another object of this invention is to provide a level, as aforesaid, which provides a plurality of bubble vials for visually indicating angular alignment.

Still another object of this invention is to provide a level, as aforesaid, which provides a speech generator for generating an audible message indicative of a sensed angular measurement.

Yet another object of this invention is to provide a level, as aforesaid, in which the speech generator is capable of generating audible messages in "rise and run" format.

A further object of this invention is to provide a level, as aforesaid, in which the speech generator is capable of generating audible messages in a selectable language.

A still further object of this invention is to provide a level, as aforesaid, which can transmit an appropriate audible message to a remote receiver and speaker.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 7 is a fragmentary sectional view of the optically encoded disk and related circuitry taken along line 7—7 of FIG. 2a.

FIG. 8a is a perspective view of the level as in FIG. 1 in use on a vehicle and with a remote receiver/speaker;

FIG. 8b is a perspective view on an enlarged scale of the level as in FIG. 8a; and FIG. 8c is a front view of the receiver/speaker as in FIG. 8a.

DESCRIPTION OF THE PREFERRED EMBODIMENT

An electronic level with visual and audible indicators according to the preferred embodiment of the present invention will now be described with reference to FIGS. 1 through 8c of the accompanying drawings.

Figure 1:
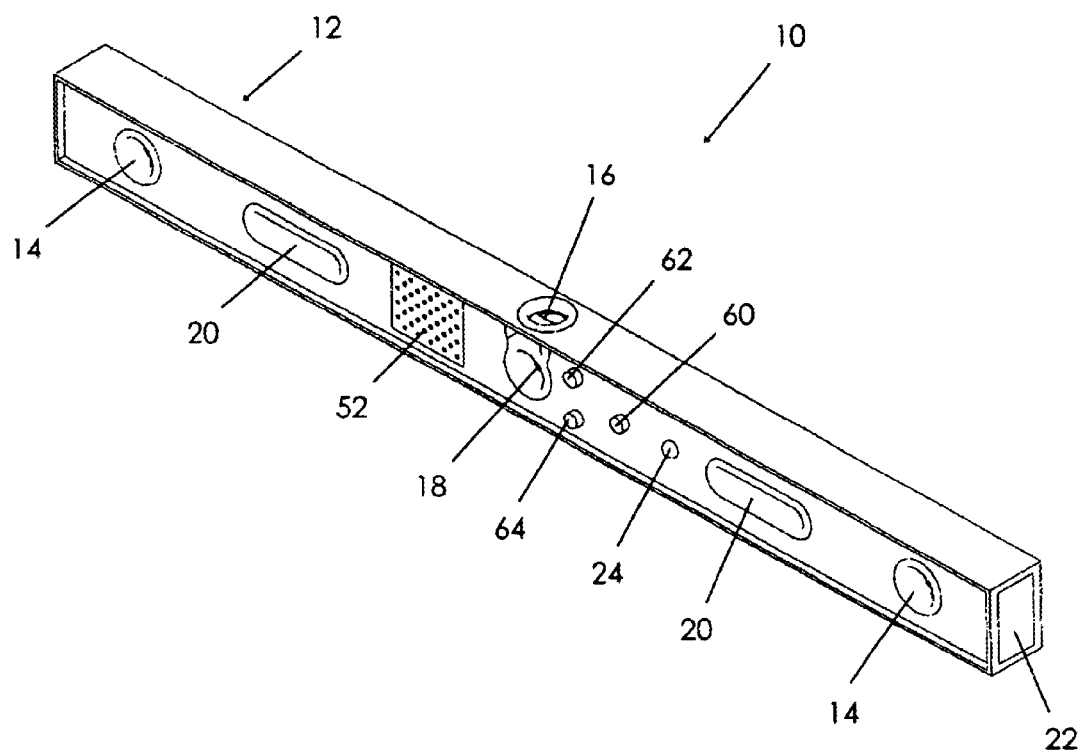
FIG. 1 is a perspective view of an electronic level with audible and visual indicators according to a preferred embodiment of the present invention.

The electronic level 10 includes a rigid, substantially rectangular frame 12 constructed of rigid materials that resist deformity or bending. Preferably, the frame 12 is constructed of a metallic material although a wooden, plastic-graphite, poly-carbonate, or other plastic construction would also be suitable. The frame 12 includes a longitudinally elongate construction (FIG. 1). The preferred length from end to end is approximately four feet. The frame 12 defines an interior space for housing various sensing and indicating means as to be described below.

Figure 2A:
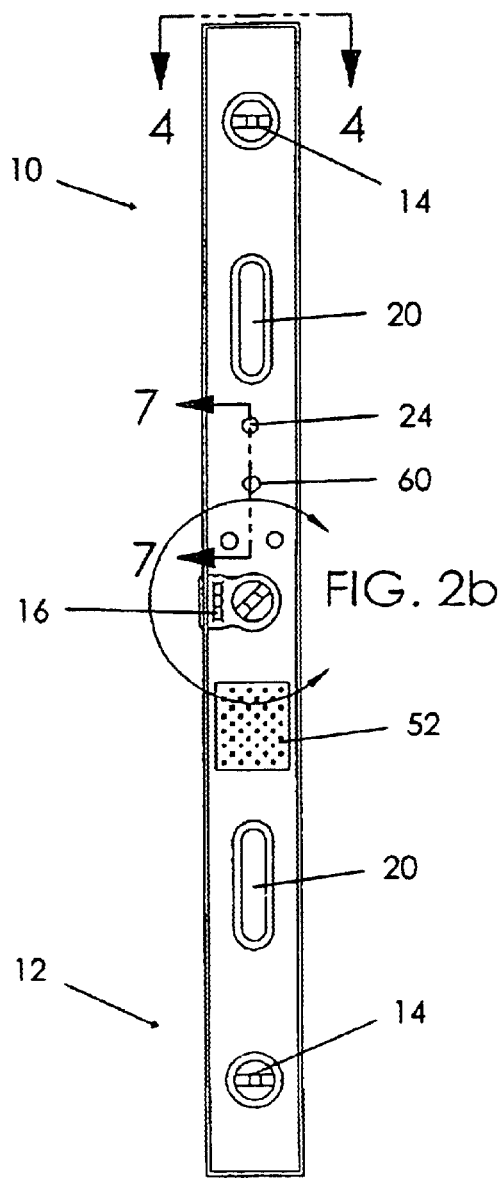
FIG. 2a is a front view of the level as in FIG. 1.
Figure 2B:
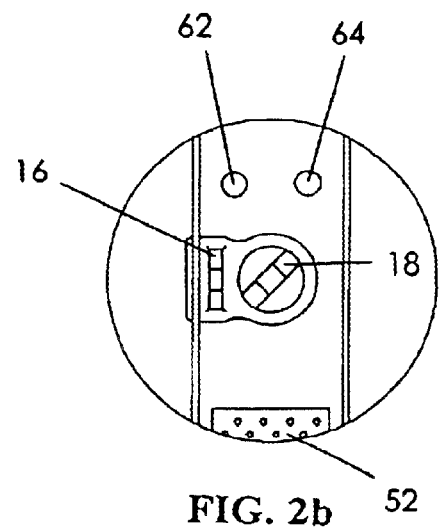
FIG. 2b is an isolated view on an enlarged scale of a 45 degree bubble vial and selector switches mounted on the level as in FIG. 1.
Figure 3:
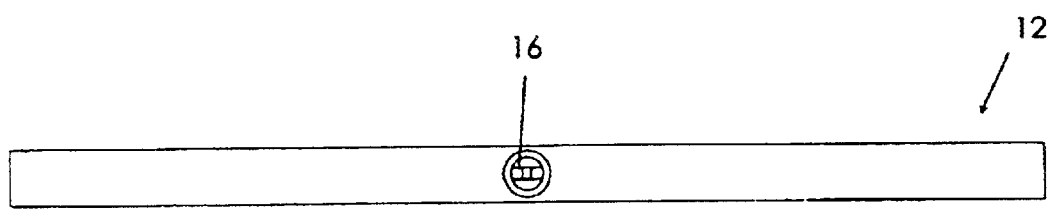
FIG. 3 is a top view of the level as in FIG. 1.
Figure 4:
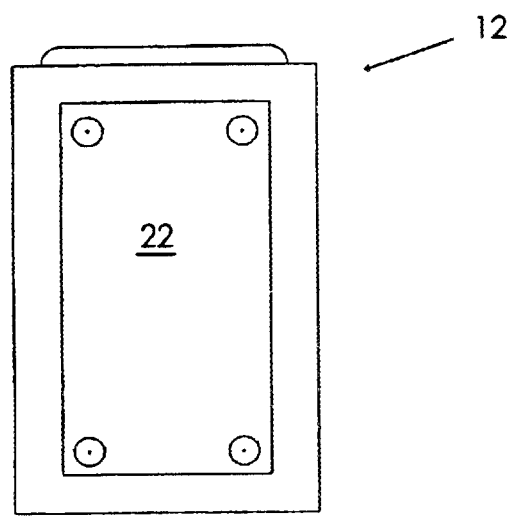
FIG. 4 is an end view of the level on an enlarged scale taken along line 4—4 of FIG. 2b.

Multiple bubble vials are mounted to the frame 12 for visually indicating when the frame is in various angular alignments (FIGS. 1-2b). Each bubble vial 14 positioned adjacent a respective end of the frame 12 has a longitudinal axis perpendicular to top and bottom edges of the frame 12 and measure vertical inclination. Additional bubble vials 16 are mounted on the front and top of the frame 12, each having a longitudinal axis parallel to top and bottom edges, these vials measuring horizontal inclination. Still another vial 18 has a longitudinal axis configured at a 45 degree angle relative to the top and bottom frame edges for indicating proper alignment at a 45 degree inclination. The bubble vials 14, 16, 18 are not connected to any of the electronic circuitry (to be described below) and can be used as a visual indication of horizontal, vertical, or 45 degree condition and can also be used to verify the operational accuracy of the electronic level.

The frame 12 defines a pair of handle openings 20 that enable a user to easily transport or adjust the position of the level 10 (FIG. 1). Therefore, the handles 20 and relative light weight of the instrument allow the level 10 to be very portable. The frame 12 further defines a first cavity adjacent an end thereof for housing a battery power source. A battery access door 22 is removably coupled to that end for selectably covering the first cavity. A low-battery LED 24 is positioned on the front face of the level (FIG. 1) and is electrically connected to the battery cavity for indicating a low battery condition. The frame 12 defines a second cavity for housing electronic components and other means for detecting the angular position of the frame, as to be described more fully below.

Figure 6:
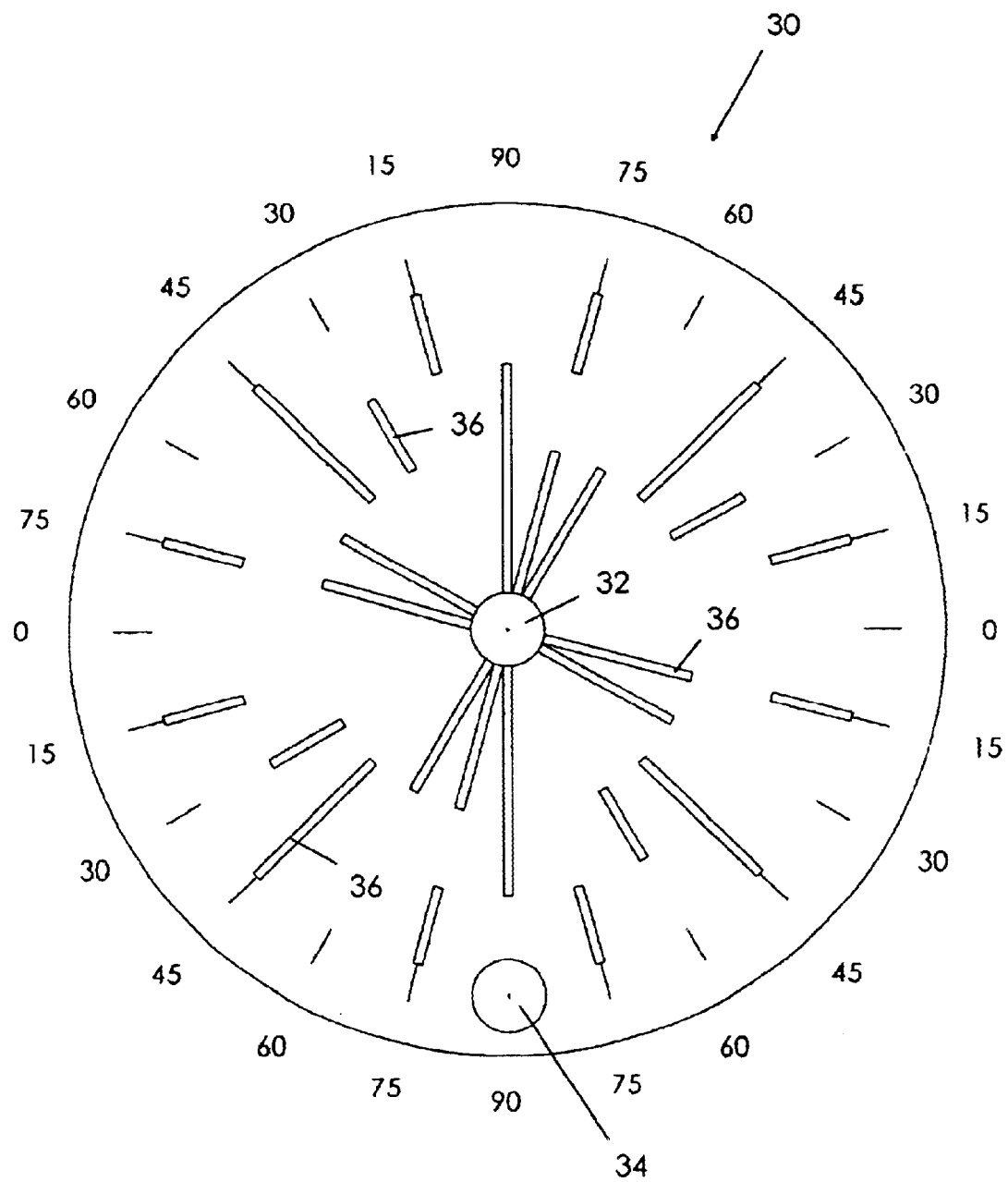
FIG. 6 is a top view of the optically encoded disk.

The level 10 includes a sensing means mounted within the second cavity for detecting the angular position of the frame 12. The sensing means includes an optically encoded disk 30 pivotally mounted about a shaft 32 that spans between the front and back faces of the frame 12 within the second cavity. The disk 30 may be mounted with bearings such that the disk is freely rotatable about the shaft 32. A weight 34 is fixedly attached to a radial edge of the disk 30 such that the disk 30 is rotated about the shaft 32 as the weight 34 is attracted to the Earth's surface by gravity. The disk 30 is constructed of a substantially transparent material and includes a plurality of opaque radial lines 36 imprinted thereon (FIG. 6). Corresponding circuitry is operatively connected to the disk 30 for determining the angular position of the frame 12 and for generating an appropriate audible message accordingly, as to be described more fully below. The opaque radial lines 36 may be applied to the disk with a durable paint, such as black enamel or other suitable means. The lines 36 are spaced apart in predetermined positions and correspond to various angles of inclination, with the 0° position corresponding to a horizontal or level condition. Although the disk 30 shown in FIG. 6 includes opaque lines at 15 degree intervals, it is understood that additional lines may be included such that 1 degree intervals may be detected.

The weight 34 is positioned precisely 90 degrees from the opaque radial line defined by 0° or the level condition. The disk 30 is oriented so as to reside in a plane that is perpendicular to the surface of the Earth, so that the weight 34 will be deflected by gravity in a radial direction toward the center of the Earth.

Figure 7:
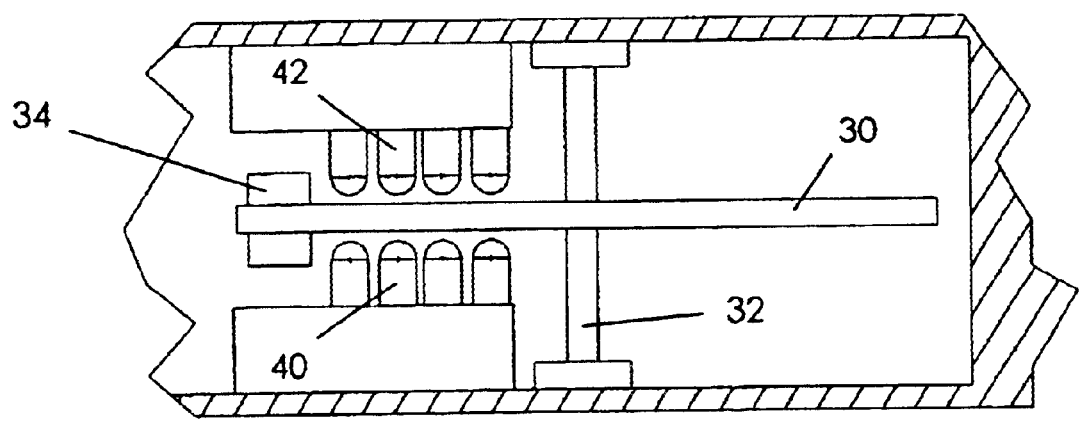

At least one light-emitting source 40 is mounted adjacent a first side of the disk 30 and at least one light sensor 42 is correspondingly mounted adjacent a second side of the disk 30 (FIG. 7). In the preferred embodiment, there are four light-emitting sources 40 and four light sensors 42 connected in series, respectively. Each light-emitting source is a light-emitting diode ("LED") and each sensor is a photosensitive transistor. Each LED 40 and corresponding light sensor 42 are positioned such that light is directed along a path therebetween that is substantially perpendicular to the disk 30. The disk, therefore, is interposed between the light-emitting sources 40 and sensors 42.

The LED's 40 emit a beam of light substantially parallel to the disk shaft 32 in a direction toward the disk 30. The light sensors 42 are mounted so that they are longitudinally aligned with the four LED's 40. In their "normal" state, the light passes through the clear disk 30 and is received by corresponding light sensors 42. However, when an opaque encoding line 36 passes between an LED 40 and corresponding light sensor 42, the sensor generates a sensed signal. In combination, the sensed signals from the light sensors 42 form binary numbers which may be used to represent the angular inclination of the frame and thus which audible message should be generated, as to be described more fully below.

Figure 5:
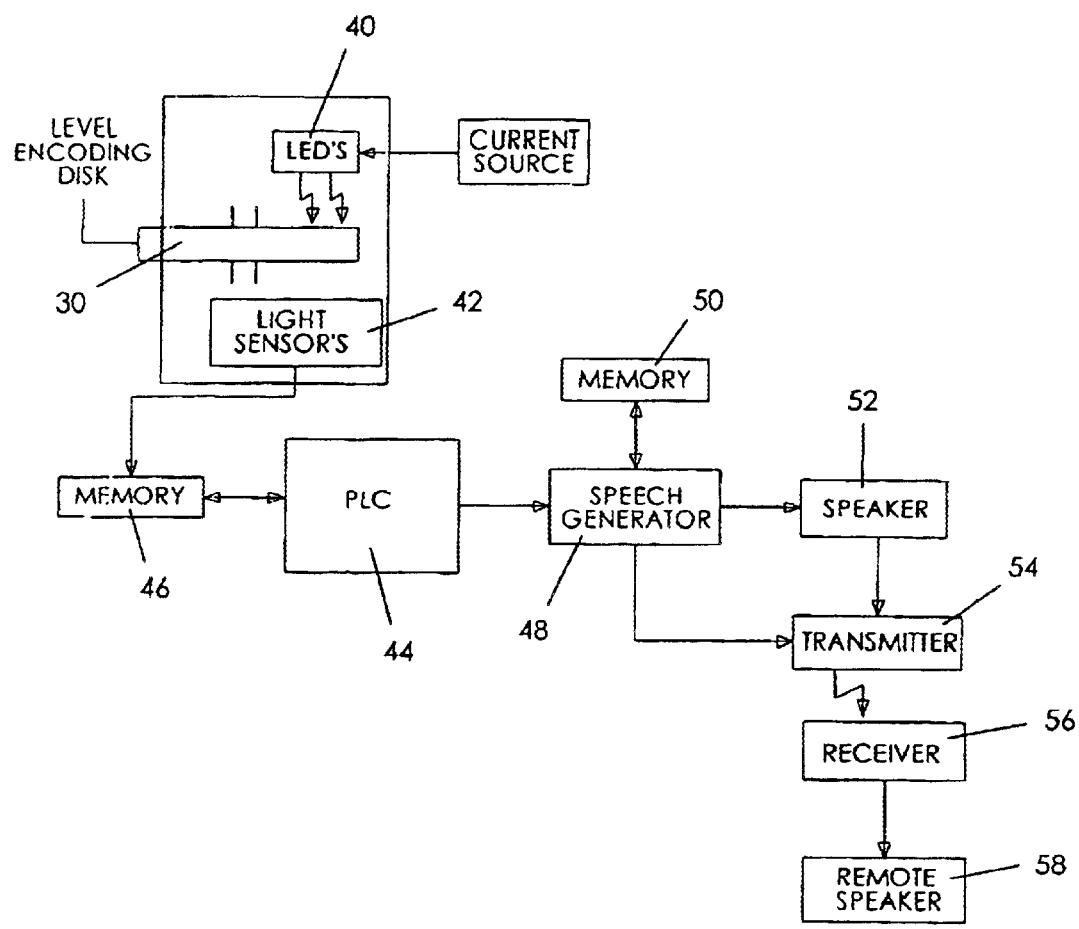
FIG. 5 is a block diagram of the electronic components of the level as in FIG. 1.

The circuitry operatively connected to the disk 30 further includes a programmable logic chip 44 ("PLC") having a memory 46 (FIG. 5). Sensed signals generated by the light sensors 42 may be stored in that memory 46 and analyzed by the programmable logic of the PLC 44. It is understood that those skilled in the art could also accomplish this storage and processing using conventional hard-wired circuitry and components such as a latch, flip-flops, etc. The PLC 44 may be programmed to process a sensed signal only when the signal has not changed for a predetermined amount of time (e.g. when the level has come to rest at a particular inclination).

Figures 8A, 8B, 8C:
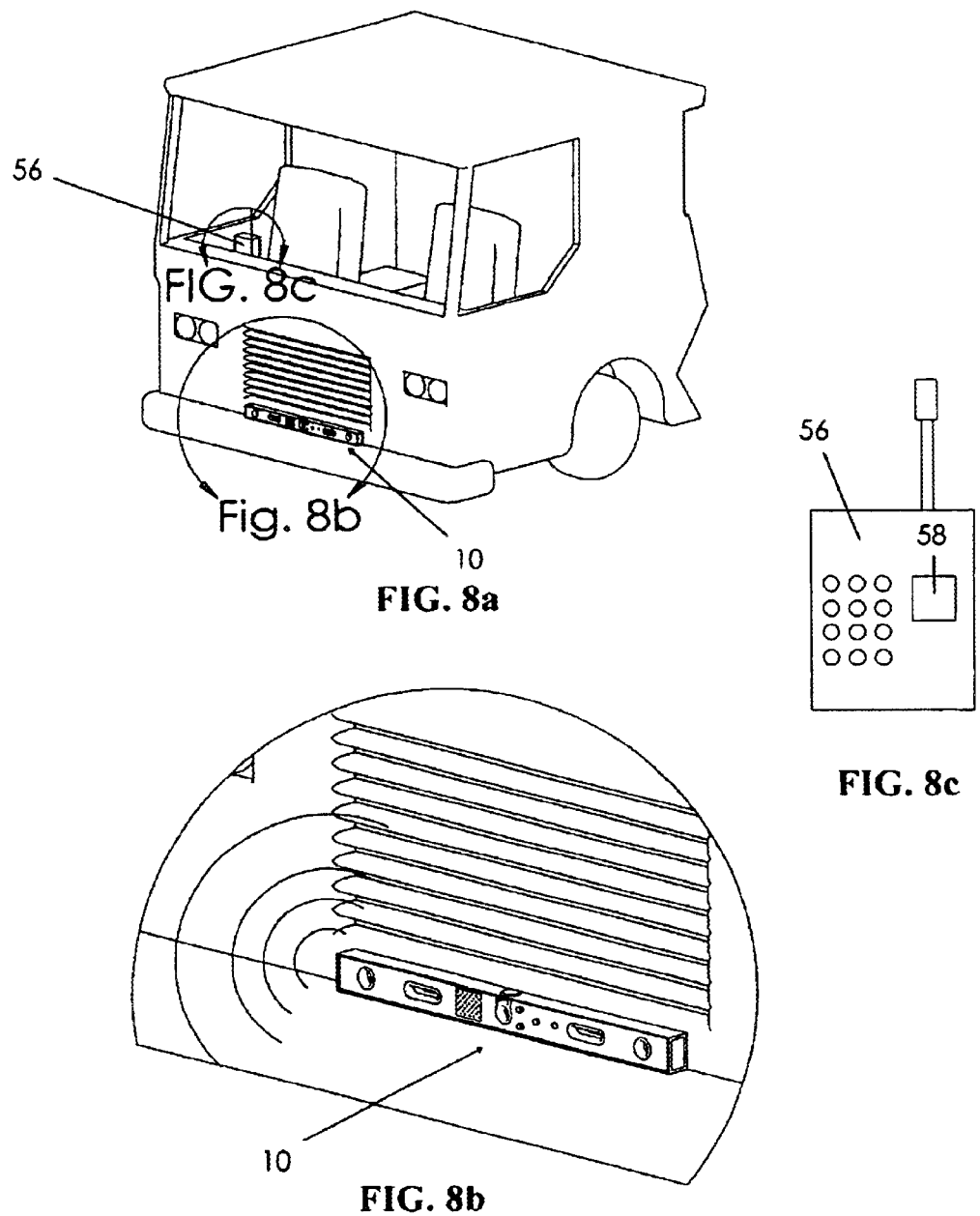

The PLC 44 is electrically connected to a speech generator 48 (i.e. a sound chip) which also includes or is electrically connected to a memory 50 (FIG. 5). A plurality of audible messages corresponding to angular inclinations for at least each one degree angular increment between 0° and 360° are digitally stored in the speech generator memory 50. Other audible messages such as "level", "horizontal", etc. may also be stored in the speech generator memory 50. The speech generator 48 includes comparator circuitry by which a sensed signal from the PLC memory 46 that is electrically delivered to the speech generator 48 is compared and matched with an appropriate audible message stored in the speech generator memory 50 via a lookup table or other similar data structure. The appropriate audible message is then delivered to a speaker 52 whereby it is emitted. Alternatively, the speech generator 48 may be connected to a transmitter 54 for transmitting the message through the air to be received by a remote receiver 56, such as via an RF signal. The receiver 56 may be coupled to a remote speaker 58 whereby the signal is emitted (FIGS. 8a-8c).

Further, corresponding audible messages in languages other than English may also be stored in the speech generator memory 50. A language selector button 60 is positioned on the front face of the frame 12 (FIG. 2a) and is electrically connected to the PLC 44 for selecting the language set that is desired. The PLC 44 may deliver this selection to the speech generator 48 when a sensed signal is delivered thereto.

Another pair of selector buttons are mounted to the front face of the frame 12 (FIG. 2a). An angular measurement selector button 62 may be depressed by a user when audible messages in angular inclination format are desired whereas a "rise and run" selector button 64 may be depressed when audible messages in "rise and run" format are desired. A "rise and run" format is simply another way to express angular inclination and is best understood by those skilled in the trades when determining the pitch of a roof. These buttons are also electrically connected to the PLC 44 and are thereby delivered to the speech generator 48 in due course. Corresponding audible messages in angular and rise and run formats are stored in the speech generator memory 50 and may be emitted in the format selected by a user according to a sensed signal. These selector buttons 62, 64 may also be used as on/off switches.

In use, the level 10 may be activated when a user presses either the angular selector button 46 or the rise and run selector button 64 (FIG. 1). A user may also initially select a desired language using the language selector button 60. The bubble vials 14, 16, 18 may be observed by a user for visually determining proper alignment in a conventional manner. As the frame 12 of the level 10 is positioned upon a workpiece, the encoding disk 30 positioned within the second frame cavity rotates as the weight 34 is attracted to the ground surface by gravity. As the LED's 40 and light sensors 42 detect the opaque radial lines 36 on the disk 30, sensed signals indicative of particular angular inclinations are stored in the memory 46 connected to the PLC 44 (FIG. 5). When the PLC 44 determines that the frame 12 is at rest, the last sensed signal is delivered to the speech generator 48 where it is matched up with an appropriate audible message in accordance with selector button data. The selected audible message is then delivered to a speaker 52 where it is emitted.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An instrument for indicating angular inclinations relative to a horizontal ground surface, comprising:
   a frame having a pair of opposed ends defining a substantially rectangular configuration;
   sensing means for determining an angular inclination of said frame relative to the ground surface, said sensing means including a rotatable disk having first and second sides and having a weight that is attracted to the ground surface by gravity, said disk having electronic circuitry coupled thereto for detecting the rotatable position of said disk;
   indicating means activated by said sensing means for generating an audible word corresponding to said angular inclination of said frame;
   wherein said disk is constructed of a substantially transparent material with a plurality of opaque radial lines imprinted thereon;
   said sensing means comprising:
      a light-emitting source mounted adjacent said first side of said disk;
      a light sensor mounted adjacent said second side of said disk, said light-emitting source directing light toward said light sensor along a path substantially perpendicular to said disk, whereby said disk is interposed between said light-emitting source and said light sensor;
   wherein said light sensor is adapted to generate sensed signals responsive to said opaque radial lines;
   wherein said indicating means includes a speech generator having a fast memory for storing a plurality of audible messages corresponding to respective degrees of inclination;
   said circuitry comprising:
      a second memory operatively connected to said light sensor for receiving and storing said sensed signals;
      logic means electrically connected to said first and second memories and to said speech generator for determining and selecting a particular audible message from said plurality of audible messages corresponding to a respective sensed signal;
   a speaker electrically connected to said speech generator and adapted to receive and emit said particular audible message selected by said logic means;
   a transmitter electrically connected to said speech generator adapted to generate an output signal indicative of said particular audible message and to transmit said output signal;
   a receiver adapted to be positioned remotely from said transmitter for receiving said transmitted output signal; and
   a remote speaker electrically connected to said receiver and positioned outside and remotely separated from said frame and from said first speaker for receiving and emitting said transmitted output signal.

2. The instrument as in claim 1 further comprising:
   a flat bubble vial mounted to said frame for visually indicating when said frame is disposed at a horizontal inclination with respect to the ground surface; and
   a second bubble vial mounted to said frame for visually indicating when said frame is disposed at a vertical inclination with respect to the ground surface.

3. The instrument as in claim 1 further comprising a third bubble means mounted to said frame for visually indicating when said frame is disposed at a 45 degree angle with respect to the ground surface.

4. The instrument as in claim 1 wherein said indicating means is activated at one degree internals of angular inclination.

5. The instrument as in claim 1 wherein said plurality of messages stored in said first memory include corresponding sets of messages stored in multiple languages; and
   said instrument further comprising means for selecting a desired set of messages to be selectively emitted.

6. An instrument for indicating angular inclinations relative to a horizontal ground surface, comprising:
   a frame having a pair of opposed ends defining a substantially rectangular configuration;
   sensing means for determining an angular inclination of said frame relative to the ground surface, said sensing means including a rotatable disk having first and second sides and having a weight that is attracted to the ground surface by gravity, said disk having electronic circuitry coupled thereto for detecting the rotatable position of said disk;
   indicating means activated by said sensing means for generating an audible word corresponding to said angular inclination of said frame;
   wherein said disk is constructed of a substantially transparent material with a plurality of opaque radial lines imprinted thereon;
   said sensing means comprising:

a light-emitting source mounted adjacent said first side of said disk;

a light sensor mounted adjacent said second side of said disk, said light-emitting source directing light toward said light sensor along a path substantially perpendicular to said disk, whereby said disk is interposed between said light-emitting source and said light sensor;

wherein said light sensor is adapted to generate sensed signals responsive to said opaque radial lines;

wherein said indicating means includes a speech generator having a first memory for storing a plurality of audible messages corresponding to respective degrees of inclination;

said circuitry comprising:

a second memory operatively connected to said light sensor for receiving and storing said sensed signals;

logic means electrically connected to said first and second memories and to said speech generator for determining and selecting a particular audible message from said plurality of audible messages corresponding to a respective sensed signal;

a speaker electrically connected to said speech generator and adapted to receive and emit said particular audible message selected by said logic means;

a first bubble vial mounted to said frame for visually indicating when said frame is disposed at a horizontal inclination with respect to the ground surface; and a second bubble vial mounted to said frame for visually indicating when said frame is disposed at a vertical inclination with respect to the ground surface;

a third bubble vial mounted to said frame for visually indicating when said frame is disposed at a 45 degree angle with respect to the ground surface;

a transmitter electrically connected to said speech generator adapted to generate an output signal indicative of said particular audible message and to transmit said output signal;

a receiver adapted to be positioned remotely from said transmitter for receiving said transmitted output signal; and a remote speaker electrically connected to said receiver and positioned outside and remotely separated from said frame and from said first speaker for receiving and emitting said transmitted output signal.

\* \* \* \* \*